United States Patent [19]
Stout et al.

[11] 3,791,217
[45] Feb. 12, 1974

[54] TEMPERATURE SENSOR EMPLOYING MARRIED DIODE JUNCTION MEANS

[75] Inventors: Beauford F. Stout, Grandview; George W. Hann, Fort Worth, both of Tex.

[73] Assignee: Kodata, Inc., Fort Worth, Tex.

[22] Filed: Nov. 8, 1971

[21] Appl. No.: 196,269

[52] U.S. Cl............ 73/342, 73/362 SC, 317/235 Q
[51] Int. Cl............................ G01k 7/24, H011 1/22
[58] Field of Search......... 73/342, 362 AR, 362 SC; 317/234 W, 235 Q

[56] References Cited
UNITED STATES PATENTS

| | | | |
|---|---|---|---|
| 3,330,158 | 7/1967 | Simonyan et al. | 73/362 SC |
| 2,098,650 | 11/1937 | Stein | 73/362 AR |
| 3,575,053 | 4/1971 | Telinde | 73/362 AR |
| 3,211,000 | 10/1965 | Childs | 73/342 |
| 3,271,660 | 9/1966 | Hilbiber | 307/310 X |
| 3,440,883 | 4/1969 | Lightner | 73/362 SC |

Primary Examiner—Richard C. Queisser
Assistant Examiner—Frederick Shoon
Attorney, Agent, or Firm—Wofford, Felsman & Fails

[57] ABSTRACT

An improved system employing a plurality of economical, linear and interchangeable temperature sensors, characterized by (1) diode junction temperature sensors that include a plurality of serially connected diode junctions that are preselected to have a predetermined standard operating curve, at a constant current within the range of −100° F. to +350° F.; and (2) power supply means and regulator means for maintaining a substantially constant current flowing through the diode junction temperature sensor. Also disclosed are specific embodiments including: (1) temperature sensors connected with an electrical common and employing a single readout lead carrying a signal that is relatively insensitive to the length of the lead, and (2) multiplexing equipment for monitoring a plurality of such readout leads.

5 Claims, 6 Drawing Figures

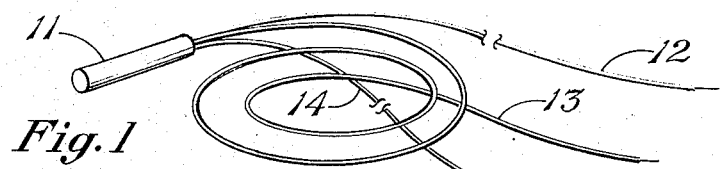
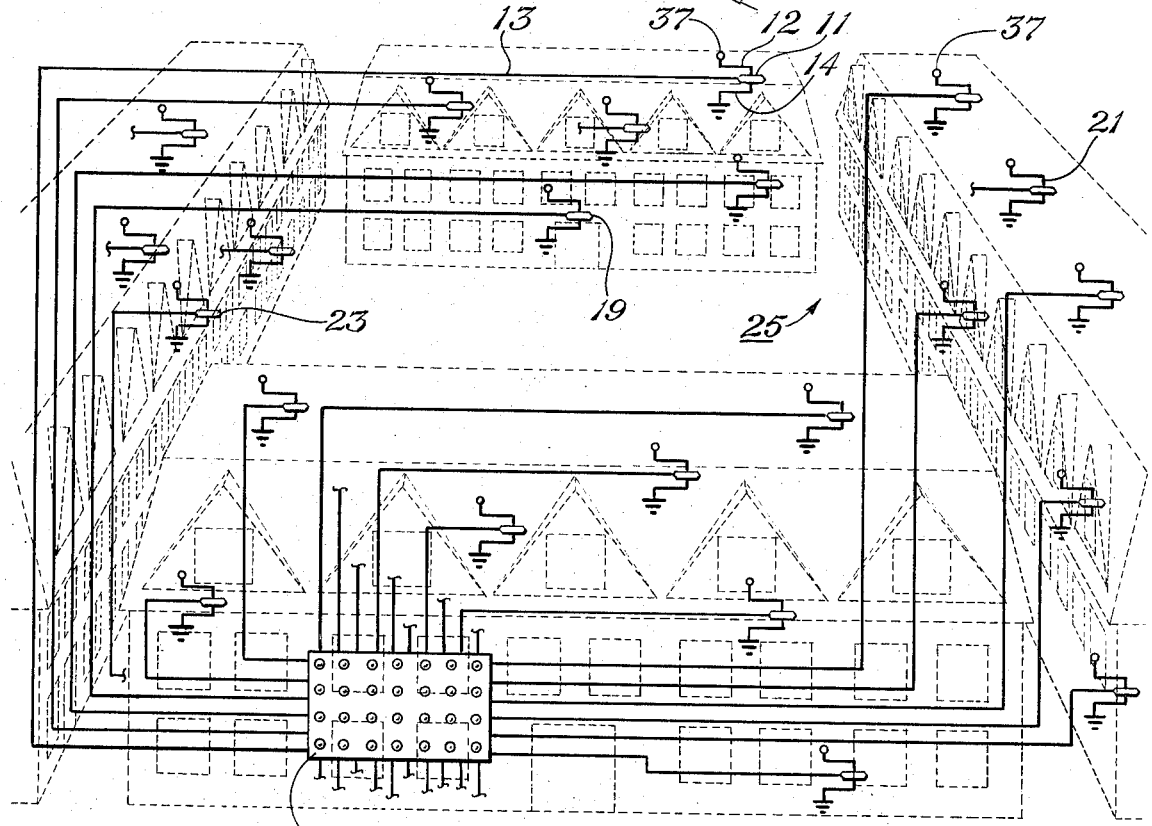
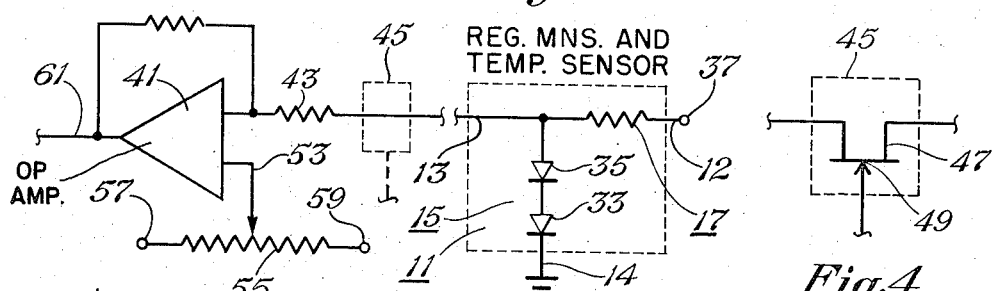
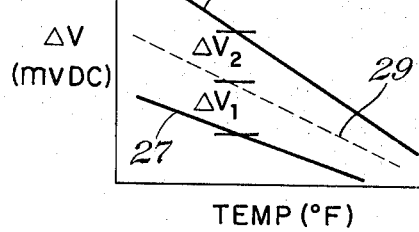

TEMPERATURE SENSOR EMPLOYING MARRIED DIODE JUNCTION MEANS

BACKGROUND OF THE INVENTION

1. Field of the Invention

This invention relates to solid state temperature measuring devices. More particularly, it relates to an improved system employing a plurality of temperature sensors wherein economy, linearity and interchangeability of the temperature sensors is a desirable feature.

2. Description of the Prior Art

The art of thermometry has seen the development of widely varying approaches ranging from conventional fluid thermometers through solid state temperature measuring devices. The latter have included reverse biased and forward biased semiconductor junctions. Such solid state temperature measuring devices are typified by U.S. Pat. Nos. 3,330,158; 3,421,375; and 3,430,077. As is pointed out in one or more of these patents, it has been generally recognized heretofore that simple diode thermometry was economically infeasible and impractical; particularly, where the system employed a large number of the thermometers and interchangeability was required. This was due primarily to the fact that only about one percent of the economical commercially available diodes had the necessary same performance curve. The other diodes departed too much from any one performance curve selected as a standard. A variety of systems were adverted to to compensate for this lack of standard performance. Insofar as we are aware, however, the prior art has not succeeded in providing economical, linear diode thermometers that could be employed in a system with other diode thermometers and provide the requisite interchangeability without introducing significant errors into the system, or without requiring a recalibration of a particular one of individual auxiliary components of the system, or the like.

BRIEF DESCRIPTION OF THE DRAWINGS

FIG. 1 is an isometric view of a temperature measuring device of one embodiment of this invention.

FIG. 2 is a schematic diagram of one embodiment of this invention employing the temperature measuring device of FIG. 1.

FIG. 3 is a schematic diagram of one temperature measuring device connected with monitoring equipment in accordance with an embodiment of this invention.

FIG. 4 is a schematic diagram of a typical gate which may be employed in the embodiment of FIG. 3 in order to employ a plurality of temperature sensors in a single monitoring system.

FIG. 5 is a graph of operating, or performance, curves such as are employed in effecting the diode thermometer by combining diode junctions to have the desired operating characteristics and the requisite economy, linearity and interchangeability.

DESCRIPTION OF PREFERRED EMBODIMENTS

Figure 6:
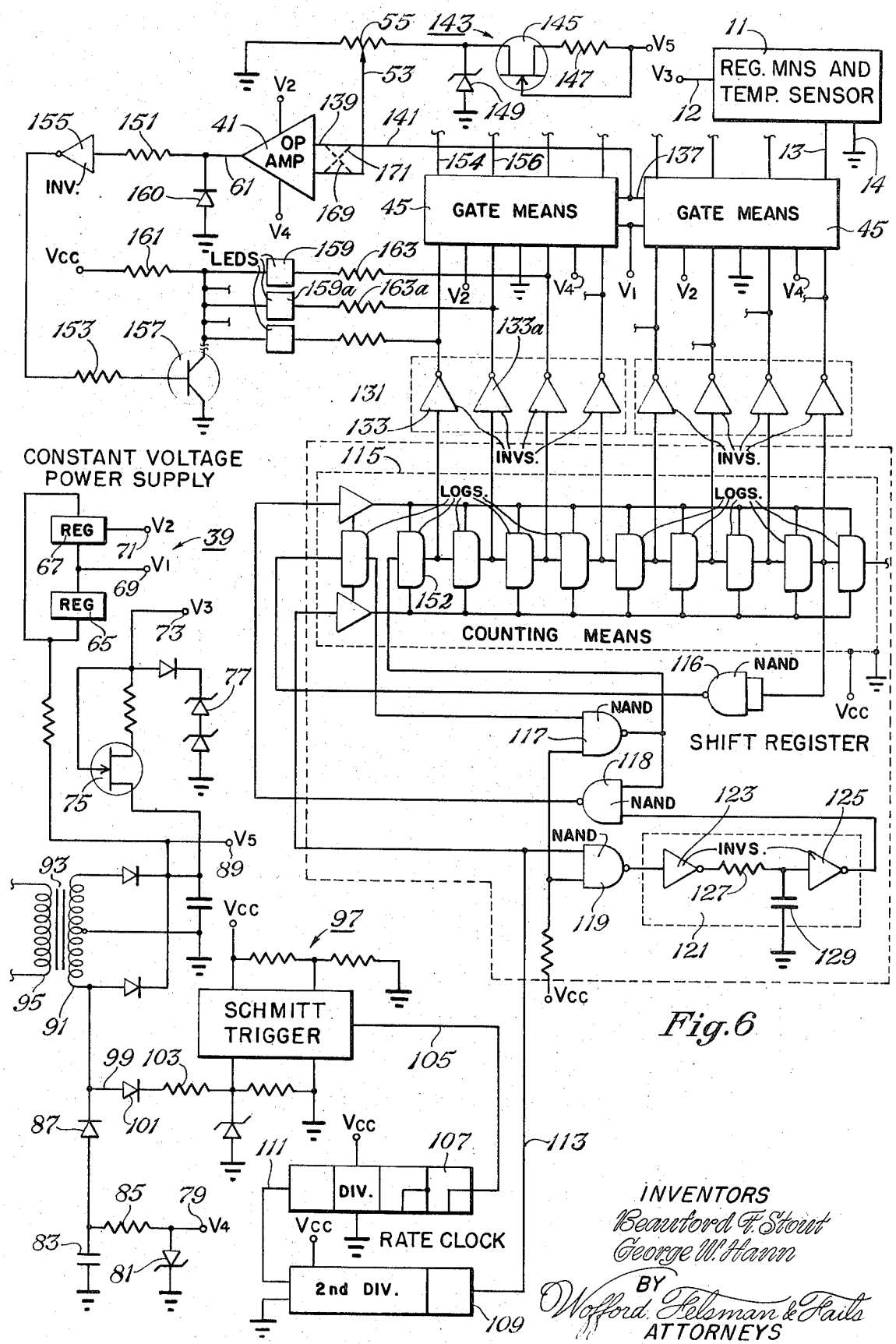
FIG. 6 is an electrical schematic diagram of a system incorporating multiplexing equipment and a plurality of temperature sensors in accordance with an embodiment of this invention.

It is an object of this invention to provide a system employing a plurality of diode thermometers that obviate the disadvantages of the prior art. Specifically, it is an object of this invention to provide a system employing a plurality of temperature sensors that are economical, linear and interchangeable such that any one may be replaced without requiring a recalibration, without requiring supplemental auxiliary equipment, and without introducing significant error into the temperature measured by the system.

Other objects of this invention will become apparent from the following descriptive matter when taken in conjunction with the drawings.

The invention comprises an improvement in a system employing a plurality of temperature sensors wherein economy, linearity and interchangeability thereof is a desirable feature. The improvement includes using diode junction temperature sensors for measuring the temperature, and power supply means and regulator means for maintaining a constant current flowing through the diode junction temperature sensor. The diode junction temperature sensors have a standard performance curve defining a predetermined voltage drop across the sensor at a predetermined temperature and a constant current flow and a voltage drop that varies substantially linearly with temperature at the constant current within the range of at least −50° F to +250° F. for the desired interchangeability. The diode junction temperature sensor includes a plurality of diode junctions that are pre-selected to have a summation of their respective departures from the predetermined standard performance curve be substantially zero and that are serially connected such that the diode junction temperature sensor has the standard performance characteristics. The power supply means and regulator means are serially connected with the diode junction temperature sensor in the forward biased direction.

Referring to the figures, FIG. 1 illustrates a typical physical form of a commercially available temperature measuring device 11 and its three leads 12–14. The temperature measuring device 11 may include only the diode junction sensor, or it may include, as illustrated in FIGS. 1 and 3, both the diode junction temperature sensor 15 and the regulator means 17. As has been recognized in the art and indicated hereinbefore, economically feasible, commercially available diodes do not have the same performance curves for a variety of reasons; such as, doping levels, transient impurities, different temperature levels during fabrication and the like. Random pairing has been employed hereinbefore to raise the signal level of the plurality of serially connected diodes. Such random pairing has frequently only worsened the lack of interchangeability, since the departures from a standard performance curve by each of the diodes were frequently additive. Consequently, diode thermometry has been restricted to scientific uses or in applications where only a single thermometer and readout equipment was required; and it has not achieved the widespread use possible where multiplexing equipment was employed in a system for monitoring a plurality of temepratures at widely spaced locations; such as illustrated by the different locations 19, 21 and 23, FIG. 2. As illustrated in FIG. 2, the locations are disposed in an apartment complex 25. The locations may be employed in large warehouse complexes, commercial buildings and the like for reasons which will become apparent from the description hereinafter.

We have found, however, that economical, linear, and interchangeable diode junction temperature sensors are made possible by the following process. A batch of commercially available diodes are pre-tested, separated, and catalogued according to their respective performance curves, as illustrated in FIG. 5. The diodes are combined in a predetermined plurality such that the sum of their departures from an ordinary performance curve is zero. Any desired plurality may be employed, depending upon the magnitude signal desired. As many as 50 or more may be combined for a signal level that does not require amplification. Ordinarily, 2, 3 or 4 diode junctions will be adequate. For example, as illustrated in FIG. 5, a first diode of a pair of diodes may have a performance curve 27, defining a first voltage drop ($\Delta v$) across the diode at a predetermined temperature and a constant current flow therethrough. As illustrated in FIG. 5, the voltage drop in millivolts direct current (mv DC) is plotted as a function of the temperature (temp.) in °F. Thus, the first diode will be placed in a bin, or receptacle, for diodes having a first voltage drop at the predetermined temperature, illustrated as a difference in voltage drops ($\Delta V1$) between the performance curve 27 and a standard performance curve 29. In the case of the first diode, the difference will be a negative $\Delta V1$, having a predetermined absolute value. In making up the diode junction temperature sensor, it is then paired with a second diode having a performance curve 31, such that at the predetermined temperature the difference between the performance curves, $\Delta V2$, has the same absolute value as $\Delta V1$ but is a positive difference. Thus, the summation of their respective departures from the predetermined standard performance curve 29, ($\Delta V1 + \Delta V2$), is substantially zero.

By the described process, all of the diode junction temperature sensors; such as diode junction temperature sensor 15 employing two diode junctions; will be economical, since substantially all of the diodes will be employed instead of the very low percentage that would otherwise have the same performance characteristics. Also, the diode junction temperature sensors will have the desired linearity, since such diode junction temperature sensors are linear and have voltage drops that are inversely proportional to the temperature over the range of $-50°$ F to $+250°$ F; and are operably linear and proportional over the range of $-100°$ F to $+350°$ F.

The temperature measuring device 11 has a low mass such that it is sensitive to temperature change. It may be prepared in three different types of "pots," or finished packages. For example, it may be prepared as an ambient air sensor for mounting under a ventilated cover or thermostat housing, as a duct sensor for mounting directly in an air conditioning duct, or as an immersion sensor for mounting in a thermal well or the like. If desired, it can be prepared for immersion directly in a fluid whose temeprature is to be measured, although the latter is normally not advisable, since removal from such an installation would necessitate stopping the flow of the fluid and thermal wells are ordinarily desirable. As illustrated in FIG. 1, the serially connected, or "married," diodes forming the diode junction temperature sensor 15, and the regulator means 17 may be emplaced in a thin-walled, heat conductive container such as a container of aluminum, and potted in epoxy resin.

Any of the known power supply means and regulator means may be employed for maintaining the requisite substantially constant current flowing through the diode junction temperature sensor. As illustrated in FIG. 3, the power supply means may comprise any direct current power source connected with terminal 37, which is connected with lead 12. Preferably, however, a constant voltage power supply is employed. For example, we have found it advantageous to employ a single power supply that regulates the voltage within $\pm 0.01$ percent when regulating at 24 volts DC. It is noteworthy, however, that as much as 0.5 volts deviation in the voltage of the power supply will produce errors of less than one degree Fahrenheit in the measured temperature. A typical constant voltage power supply is illustrated in FIG. 6 and described hereinafter with respect to the multiplexing equipment. In FIG. 2 the plurality of terminals 37 may be connected in parallel and with a single regulated voltage power supply such as constant voltage power supply 39, FIG. 6.

Illustrative of regulator means for controlling constant current are the well known elaborate constant current regulators. As described in our copending application Ser. No. 855,982, entitled "Measuring Borehole Temperatures Employing Diode Junction Means," a field effect transistor may be employed to maintain the current constant. We have found, however, that with a constant voltage power supply, we can effect a current flow that is sufficiently constant for most surface temperature monitoring installations with a relatively high resistance resistor, such as illustrated in FIG. 3. The surface temperature monitoring installations will not ordinarily be subjected to the wide variation in temperature that may be encountered in boreholes, so the substantially constant current effected by the relatively high resistance, illustrated as regulator means 17, is adequate. Preferably, however, the resistor has a zero temperature coefficient such that its resistance does not change even if the temperature to which it is subjected should change, as between daylight and night time hours. Such resistors having zero temperature coefficient are known in the art, and are typified by the Corning glass resistors, which are also rugged and appropriate for temperature monitoring installations. Moreover, these zero temperature coefficient resistors are amenable to being potted with the diodes in a temperature measuring device 11, as described hereinbefore. They are sufficiently accurate and standard in value of resistance that interchangeability of the temperature measuring devices made with them presents no problem. The magnitude of the resistance of the resistors is chosen to effect the desired flow of current through the diode junction temperature sensors at the voltage of the power source. We have found it desirable to employ temperature measuring devices that require less than one milliamp of current flow, or current drain. Thus, current may be flowed continuously through the diode junction temperature sensor and a voltage which is a function of the temperature being measured maintained on its readout line 13 for rapid scanning, or monitoring, by the multiplexing equipment. Specifically, we have found a current of about 100 microamperes per diode junction temperature sensor may be maintained continuously without appreciable current drain and without heating the diode junction temperature sensor. In this way, a power supply that will supply one-half an ampere of current will excite up to 5,000 sensors simutaneously.

Referring further to FIG. 3 for a hook-up of a single temperature measuring device 11, the readout lead 13 is connected with an input terminal of operational amplifier 41. Suitable operational amplifiers are commercially available; for example, the Philbrick Nexus No. 1009 for matching inpedance. As illustrated, the lead 13 is serially connected with the operational amplifier 41 via resistor 43. If desired, as for use in multiplexing equipment, it may include a gate means 45. As illustrated in FIG. 4, the gate means 45 may comprise a field effect transistor (FET) 47 having its gate 49 connected with the multiplexing equipment. Upon the occurrence of an appropriate signal on gate 49, the DET 47 will effect the desired interconnection between the operational amplifier at the central location illustrated by panel 51, FIG. 2, and the temperature measuring device 11 at the site where the temperature is to be measured. The operation of the gate means will become clearer with the descriptive matter regarding FIG. 6 hereinafter. The operational amplifier 41 may be a field effect operational amplifier (FET OP AMP). Such operational amplifiers ordinarily have a very high impedance such as 10,000,000 ohms so that they can sample the voltage on the readout lead 13 without appreciable current flow. Thus, the temperature that is measured becomes relatively insensitive to the length of readout lead 13, because of the lack of appreciable current flow. Consequently, temperature can be measured at widely varying physical locations; and monitored and controlled at a single control point typified by panel 51, FIG. 2.

The operational amplifier 41 may also be used to suppress the base voltage of the temperature sensor at a predetermined temperature and invert the sensor output to effect a positive temperature coefficient. As illustrated in FIG. 3, the operational amplifier 41 is connected via suitable wiper means 53 with a dividing resistor 55. The dividing resistor 55 is serially connected with terminals 57 and 59 on which are imposed suitable voltages; for example, a positive 15 volts on one terminal and a negative 15 volts on the other. In this way, the wiper means 53 may be positioned to buck out the base voltage. To illustrate, if a range of 0–300 millivolts is desired as an output from the operational amplifier 41 in response to a temperature range of from 0°–300° F, the wiper means 53 may be positioned on the dividing resistor 55 to buck out the base voltage of about 3.218 volts DC for a six diode junction temperature sensor 15 at 100° F. The operational amplifier, being an inverting amplifier, will thereafter convert, for example, decreasing voltages on readout lead 13 effected by increasing temperatures inversely into an output in which the increase in output is equivalent to the increase in temperature sensed by the temperature sensor 15. The opposite is effected in response to decreasing temperatures.

In operation, the diode junction temperature sensor 15 is serially connected with electrical common, indicated by the ground symbol, with the regulator means 17, and with the power supply means connected with terminal 37. In this way, the voltage on readout lead 13 becomes a function of the voltage drop across the diode junction temperature sensor, which is also a function of temperature, as described hereinbefore. Thus, the voltage on readout lead 13; with respect to electrical common, or ground; is fed to the operational amplifier 41. The operational amplifier 41 produces an output signal, such as a voltage on conductor 61. The output signal may be employed to operate a temperature indicator such as a dial indicating the temperature, or one or more lights to indicate that the temperature is high or low. On the other hand, the output signal on conductor 61 may be fed as an input signal to a controller which operates about a predetermined temperature or within a predetermined temperature range. For example, a controller may turn on an air conditioner if the temperature goes above a predetermined maximum, or it may turn on a heater if the temperature goes below a predetermined minimum. The operation of temperature indicators or controllers when a predetermined output signal is fed to them is well known; is not being claimed, per se, herein; and need not be further described in more detail herein.

FIG. 6 illustrates an interconnection of multiplexing apparatus at a central station, typified by panel 51 in FIG. 2, and a plurality of temperature measuring devices 11, including the remote regulator means (REG. MNS.) and temperature (TEMP.) sensor, at the position at which the temperature is to be measured. Therein, a constant voltage power supply 39 is provided for supplying power at different voltage levels in accordance with the demands of the logic circuit being employed in the multiplexing equipment. As illustrated, the constant voltage power supply employs integrated regulators (REG) 65 and 67 that provide additive voltage outputs. For example, they provide 5 volt outputs such that the voltage V1 of 5 volts is supplied on the terminal 69 and the voltage V2 of 10 volts is supplied on the terminal 71. The constant voltage power supply 39 also provides a highly regulated voltage V3 for supplying power to the temperature measuring devices 11. The voltage V3 is supplied to terminal 73 and may be, for example, 24 volts. The voltage output on terminal V3 is highly regulated to a ±0.01 percent, as indicated hereinbefore, and is conducted to the respective temperature measuring devices 11, indicated by the voltage V3 on lead 12, FIG. 6. The regulation of voltage V3 is effected by a field effect transistor 75 and serially connected Zener diodes 77, in the well known manner. Similarly, appropriate other voltages may be regulated and tapped off; such as, the regulated voltage V4 maintained on the terminal 79. As can be seen, Zener diode 81, the capacitor 83 and resistor 85, in conjunction with diode 87 cooperate to provide the desired regulated voltage V4. The voltage V4 may be, for example, −15 volts for the operational amplifier 41. In like manner, a master voltage V5 may be provided on terminal 89. The appropriate voltage outputs are provided by connection with the secondary 91 of the transformer 93. The primary 95 of the transformer may be connected with a conventional 110 volt alternating current (AC) power source. The respective terminals carrying the respective voltages are suitable connected with like-marked terminals in FIG. 6. The interconnecting conductors are omitted for simplicity of illustration and clarity.

The constant voltage power supply 39 is also serially connected with the trigger means 97 via conductor 99, diode 101 and resistor 103. The trigger means 97 includes a Schmitt trigger for pulse shaping. The output terminal of the Schmitt trigger circuit is connected via conductor 105 with the rate clock. The rate clock comprises a first dividing circuit 107. For example, the first dividing circuit may decrease the number of shaped pulses from the Schmitt trigger such that every third pulse is conducted therethrough. As illustrated, the rate clock also includes a second dividing circuit 109 which is connected via conductor 111 with the first dividing circuit 107. For example, the second dividing circuit may conduct therethrough every tenth pulse on the output from the first dividing circuit 107. Under such an example as described, a 60 Hertz output from the Schmitt trigger will emerge as a 2 Hertz output from the second dividing circuit 109. The dividing circuits are also connected with the voltage source Vcc and with electrical common, or ground, as illustrated.

The output terminal of the second dividing circuit 109 is connnected via conductor 113 with the shift register. Any of the conventional shift registers may be employed. For example, it may be a mechanically operated stepping switch. Preferably, for high speed scanning, the shift register comprises a solid state shift register such as the Signetics N8202N. As illustrated, the shift register includes a register, or counting means 115, and conventional return and operational accessories; such as, logic elements, or NAND gates, 116–119 that are conventionally employed in shift registers, and the delay means 121. The delay means 121 provides a 0.25 microsecond delay and is needed for proper operation of the shift register. As illustrated, the delay means 121 comprises serially connected hex inverters 123 and 125, and resistor 127 that are also serially connected to the output from logic element 119 and to one input terminal of the logic element 118. The juncture of resistor 127 and hex inverter 125 is connected with ground via capacitor 129. Basically, the shift register operates in the fashion of a conventional ring counter in stepping the respective output signals from the second clock unit 109 onto the gate means 45, FIG. 4, that will interconnect the respective temperature measuring devices 11 with the amplifier 41. When the last temperature measuring device 11 has been monitored, the shift register effects a return of the first temperature measuring device 11 to repeat the cycle. The scanning rate may be at any desired rate up to 1,000,000 times per second. Ordinarily, a scanning rate within the range of between a few times per second or less to a few thousands of times per second will be adequate. As indicated, the register 115 is also serially connected with the voltage source Vcc and with the electrical common, or ground.

As illustrated in FIG. 6, the respective outputs from the shift register are connected to respective input terminals of elements in a translator means 131 for altering the logic output level. For example, the logic output from the shift register may be 5 volts. The translator means 131 alters the 5 volts to 0 volts which is supplied to the gate means 45; and, specifically to gate 49, FIG. 4, of the field effect transistor 47. The zero voltage on gate 49 allows FET 47 to conduct. For example, the respective elements inside the translator means 131 may comprise conventional hex inverters (INV) 133. Thus, the respective hex inverters 133 actually serve as drivers to drive the field effect transistors into a conducting or nonconducting state in order to effect the scanning, or interconnection, of the respective diode junction temperature sensors with the respective monitoring means; such as, comprising operational amplifier 41. If desired, compatible logic levels can be employed to obviate the necessity for the translator means 131.

The respective output terminals of the translator means 131 are connected with respective input terminals on the gate means 45, as illustrated in FIGS. 4 and 6. The use of a plurality of field effect transistors as gate means 45 is well known. For example, we have found that the Siliconix, DG172BK provides satisfactory gating for connecting the respective temperature measuring devices 11 with the operational amplifier 41 in response to a signal from translator means 131. The output terminal 137 of the gate means 45 is connected with the input terminal 139 of the operational amplifier 41 via conductor 141. Teh other input terminal of the operational amplifier 41 is connected via wiper means 53 with the resistor 55 for effecting the desired balancing of the operational amplifier, or suppression of the base voltage of the temperature measuring device at a predetermined temperature, as described hereinbefore. The operational amplifier 41 is also connected with the voltages V2 and V4. The resistor 55 is serially connected with a temperature compensated, regulated reference voltage source 143, such that any desired temperature threshold may be employed by biasing out a predetermined base voltage on the temperature measuring devices 11. As illustrated, the reference voltage source 143 comprises the field effect transistor 145 and resistor 147 serially connected with the voltage source V5; with the conventional Zener diode 149 connected with electrical common, or ground, for further fine voltage regulation.

As described with respect to FIG. 4, the output signal from operational amplifier (OP AMP) 41 is impressed on conductor 61 for any desired use; such as, to energize a light indicating when the temperature is off control, to actuate a controller, or to provide a visual indication of temperature. As illustrated in FIG. 6, the conductor 61 is connected via serially connected resistors 151 and 153 and inverting amplifier 155 with the base of transistor 157. The transistor 157 is serially connected to the juncture of the light emitting diodes (LED) 159 and resistor 161 and to electrical common. The juncture of the respective light emitting diodes 159 and resistor 161 is thus driven to ground by the normally conductive transistor 157. The presence of a signal on conductor 61, however, turns "off" transistor 157 and provides the voltage Vcc as power for the light emitting diodes 159. The light emitting diodes 159 are connected, via their respective resistors 163 with the juncture of the hex inverters 133 and the gate means 45 such that when the output of a hex inverter is driven to zero by a positive output pulse on the shift register, an effective ground is also supplied to a light emitting diode and it will become energized. Diode 160 clips any negative signal from operational amplifier 41 on conductor 61 and prevents a negative signal on the hex inverters 133. The signal on conductor 61 also may be employed directly to operate a control device; or a control device may be optically coupled to the respective light emitting diodes 159. There are a plurality of light emitting diodes 159, one for each temperature measuring device 11 and each is connected back to its respective interconnection between its hex inverter 133 and its gate means 45.

The light emitting diodes 159 are thus connected such that they become energized by, for example, a temperature drop of a small temperature differential. For example, breadboard models have been so sensitive that merely moving the hand away from the temperature indicating device 11 would cause a light emitting diode 159 to become energized. Control within 0.5° F is routine. While the illustrated connection will cause the light emitting diode to become energized on a temperature drop of about 0.5° F from the control point; the opposite interconnection, illustrated by dashed lines 169 and 171, may be employed to cause the light emitting diode to become energized on a temperature rise of the same magnitude. Thus, it can be seen that two operational amplifiers may be employed with their respective outputs connected directly to controllers; such as, for controlling either heaters or air conditioners, as the case may be.

In operation, the primary 95 of transformer 93 of the constant voltage power source 39 is connected with a conventional source of power and the various voltages V1-V5 are supplied throughout the multiplex and temperature measuring system. The trigger means 97 is started and the shaped pulse output from the Schmitt trigger operates the rate clock. The rate clock emits pulses which effect operation of the shift register. For example, the output from a first logic unit (LOG) 152 of the shift register is sent to the first hex inverter 133 in the translator means 131 and thence to the gate means 45. Accordingly, a first temperature measuring device (not shown), comprising a regulator means and temperature sensor, is connected as by conductor 154 (shown discontinuous) with the operational amplifier 41. As indicated hereinbefore, the interconnection is made without appreciable current flow such that the length of the conductor 154, which is the same as the readout lead 13, is relatively immaterial. If the temeprature measured at the first temperature measuring device 11 is within control range, nothing happens. The shift register shifts at the next pulse from the rate clock to connect, via hex inverter 133a, the second temperature measuring device (not shown) via conductor 156. Effective ground is supplied simultaneously via resistor 163a to light emitting diode 159a, just as it was to light emitting diode 159 as the first temperature measuring device was monitored. Suppose that the second temperature was off its control point; for example, the temperature was too low. Accordingly, the operational amplifier 41 will effect an output signal on line 61 which will be suitably inverted by the inverting amplifier 155 and turn off transistor 157, simultaneously supplying power to the light emitting diode 159a. Accordingly, light emitting diode 159a will be energized to indicate that the temperature is off control. If a controller is connected to the light emitting diode, as by an electro-optic system, it will turn on a heater to supply heat to that location.

The scanning of the temperatures and operation of respective controls (not shown) is continued through all of the temperature measuring devices 11. Suitable controls are activated to bring the respective temperatures within controlled limits. Thereafter, the logic elements effect a return of the shift register to the first temperature measuring device and the cycle is repeated. A large number of temperature measuring devices 11 may be emplaced throughout a large plant, or as illustrated in FIG. 2, an apartment complex; and the temperatures at their respective locations monitored and controlled. With the illustrated solid state multiplexing equipment the temperature measuring devices may be scanned as rapidly as needed to ensure continuity of control. Moreover, very little current is required to supply as many as 3,000–5,000 temperature measuring devices in a given industrial location. Since the cumulative parallel-connected impedance may be lowered to an appreciable degree with many; for example, more than 100; temperature measuring devices connected in parallel, a plurality of banks; with each bank having its own operational amplifier, or monitoring and control equipment; may be employed.

From the foregoing descriptive matter and the drawings, it can be seen that this invention provides temperature measuring devices that eliminate expensive thermocouple wire and cold junction compensation common in the prior art; and makes linearization of the readout device unnecessary, since each temperature measuring device has a high output level (typically 3.218 volts DC at 100° F) and has a linear change (typically about 7.23 millivolts per degree Fahrenheit) that is inversely proportional to temperature. Because there is relatively little current flow through the readout leads connecting the temperature measuring devices with the power supply and the multiplex equipment, or readout device, and because the signal level is high, no shielding is required on the readout leads. The leads preferably are 22 gauge copper wire or larger.

The temperature measuring devices may be employed in simple or complex temperature monitoring installations, but this invention has its principal advantage wherein a plurality of temperature sensors are employed with a single set of multiplexing equipment such that interchangeability and linearity are effected without the use of any auxiliary equipment. Moreover, as indicated, the sensors may be located several thousand feet away from the readout device, since the lead length effect is less than 0.2° F per 1,000 feet of distance. Also, only single wire switching is necessary when the temperature measuring devices are connected with an electrical common with which the multiplexing equipment is also connected, thereby reducing multiplexing costs. Furthermore, as indicated hereinbefore, the temperature measuring devices; and particularly the diode junction temperature sensors; are completely interchangeable without the need for recalibration. Thus, any one may be replaced with another of the same number of diode junctions and not introduce significant error into the system. With these specific advantages in mind, it can be seen that the invention provides the objects delineated hereinbefore and specifically provides an economical, linear, interchangeable temperature measuring device, including a diode junction temperature sensor comprising a plurality of married diode junctions.

Although the invention has been described with a certain degree of particularlty, it is understood that the present disclosure has been made only by way of example and that numerous changes in the details of construction and the combination and arrangement of parts may be resorted to without departing from the spirit and the scope of the invention.

What is claimed is:

1. In a system employing a plurality of temperature sensors, the improvement comprising:
   a. a diode junction temperature sensor for measuring the temperature; said diode junction temperature sensor including a plurality of diode junctions that are serially connected, each diode junction having an operating curve that is different from a predetermined standard operating curve; said diode junctions being pre-selected to have a summation of their respective departures from said predetermined standard operating curve substantially zero whereby said diode junction temperature sensor has a predetermined voltage drop at a predetermined temperature and a predetermined constant current flow therethrough and has a substantially linearly varying voltage drop at said predetermined constant current within the range of −50° F. to +250° F. for the requisite economy, linearity and interchangeability;

b. power supply means and regulator means for maintaining a substantially constant current flowing through said diode junction temperature sensor; said power supply means and said regulator means being serially connected with said diode junction temperature sensor in the forward biased direction; said diode junction temperature sensor being serially connected to electrical common; and c. a readout lead connected with the juncture of said diode junction temperature sensor and said regulator means such that voltage is measured with respect to said electrical common to form a signal that is a function of the sensed temperature; said voltage being sensed with no substantial current flow on the readout lead so as to be insensitive to the length of said readout lead; said readout lead being adapted to be connected into readout means for monitoring the sensed temperature such that any temperature sensor in said system may be replaced without recalibration and without introducing significant error into the system.

2. The system of claim 1 wherein said regulator means and said diode junction temperature sensor are incorporated into a single temperature measuring device having a first lead that is connected with said power supply means, a second lead that is connected with said electrical common and said readout lead is connected with a readout means for monitoring the sensed temperature.

3. The system of claim 1 wherein said system includes multiplexing apparatus that is connected with a plurality of said readout leads of said respective diode junction temperature sensors, wherein each said regulator means and diode junction temperature sensor pass a substantially constant current that is sufficiently low such that is may be passed continuously without appreciable power consumption and without heating said diode junction temperature sensor, and the constant current from said power supply means and said regulator means is continuously passed through said diode junction means whereby said multiplexing apparatus may scan rapidly through the readout leads of said diode junction temperature sensors for monitoring temperatures at a plurality of widely scattered locations without appreciable instrument lag time being elapsed between respective monitorings.

4. The system of claim 1 wherein said constant current is less than 1 millampere.

5. The system of claim 1 wherein said constant current is about 100 microamperes.

* * * * *